(12) United States Patent
Genovese et al.

(10) Patent No.: US 8,342,337 B1
(45) Date of Patent: Jan. 1, 2013

(54) WATER SAMPLING DEVICE AND METHOD FOR USE WITH A RADIATION PROBE

(75) Inventors: James A. Genovese, Street, MD (US); Patrick M. Nolan, Havre de Grace, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 252 days.

(21) Appl. No.: 12/731,229

(22) Filed: Mar. 25, 2010

(51) Int. Cl.
*B01D 24/00* (2006.01)
*C02F 3/00* (2006.01)
(52) U.S. Cl. .................................. 210/348; 210/682
(58) Field of Classification Search .................. 210/238, 210/232, 348, 682; 250/455.11
See application file for complete search history.

(56) References Cited

U.S. PATENT DOCUMENTS

| | | | | |
|---|---|---|---|---|
| 5,503,740 A | * | 4/1996 | Callaghan et al. | 210/232 |
| 5,601,711 A | * | 2/1997 | Sklar et al. | 210/238 |

* cited by examiner

*Primary Examiner* — Nikita Wells
*Assistant Examiner* — Johnnie L Smith
(74) *Attorney, Agent, or Firm* — Ulysses John Biffoni

(57) ABSTRACT

A water sampling device and method for use with a radiation probe. The device includes a base, filtrate reservoir, filter media support disc, and sample reservoir. The sample reservoir may be interchanged with a radiation probe adaptor. The device and method provide a simple and convenient means to separate particulate solids from a water sample prior to measuring radioactivity without the need for a heat source or electrical power to evaporate the water. The device and method can be used with a variety of commercially available radiation probes and is suitable for field applications.

14 Claims, 4 Drawing Sheets

WATER SAMPLING DEVICE AND METHOD FOR USE WITH A RADIATION PROBE

GOVERNMENTAL INTEREST

The invention described herein may be manufactured, used and licensed by or for the U.S. Government.

TECHNICAL FIELD

This invention relates to the field of radioactivity measurements of water samples.

BACKGROUND

The detection of alpha and beta radiation in water samples is complicated by the fact that these forms of radiation are attenuated by water. Current procedures require evaporation of the water in a given sample in order to separate the particulate solids found in the water sample from the water prior to measuring radioactivity. Such practices are described in the International Organization for Standardization (ISO) method 9696 and U.S. Environmental Protection Agency (EPA) method 900.0. The evaporation step, as required in these methods, requires a heat source and electrical power. The additional time needed to perform the evaporation step, along with the requirement for a heat source and electrical power, are generally undesirable for field applications where time, weight, volume, and power requirements pose logistical problems. The present invention overcomes these problems by providing a water sampling device for use with a radiation probe which utilizes a filter means to separate the solids from the water, thereby eliminating the evaporation step. In addition, the device and method of the present invention allow larger volumes of water to be sampled in shorter periods of time, thus enabling short test cycles producing high concentrations of radioactive material collected onto the filter media, if such radioactive material is present in the sample. The device of the present invention can be used with a variety of commercially available radiation probes and is compact, light, and portable. As such, it is well suited for field applications.

SUMMARY

The present invention provides a simple and convenient means to separate particulate solids from a water sample prior to measuring radioactivity without the need for a heat source or electrical power. The device and method of the present invention can be used with a variety of commercially available radiation probes and is suitable for field applications. Aspects of the invention may include one or more of the following: a base for supporting the device so that it is self-standing, a filtrate reservoir for holding a water sample after it has passed through a filter media to collect solids within the water sample, a filter media support disc for holding the filter media and connecting parts, and interchangeable sample reservoir and radiation probe adaptor. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the drawings indicate like elements.

DETAILED DESCRIPTION

Figure 1:
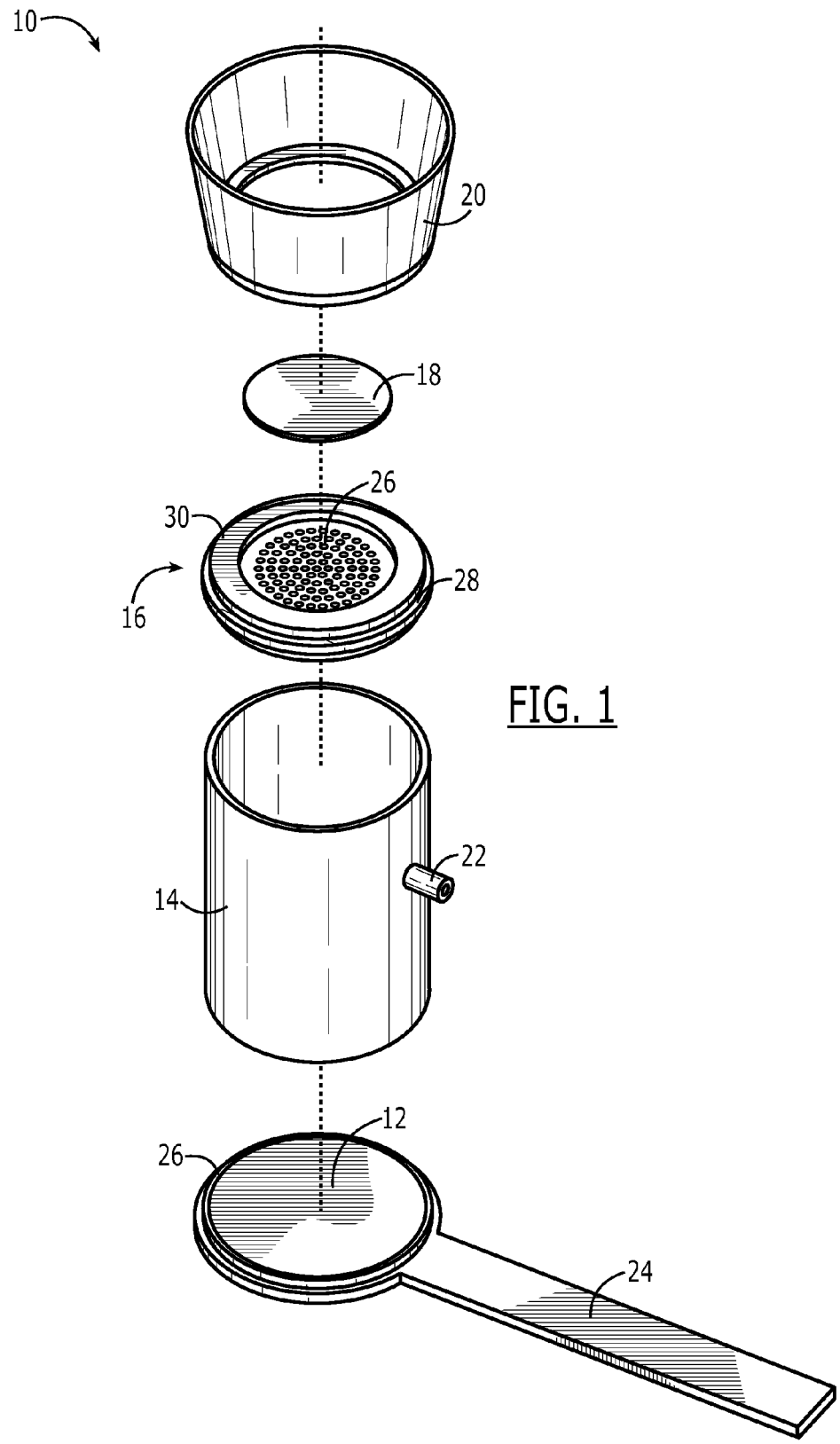
FIG. 1 is an exploded view of one embodiment of a water sampling device for use with a radiation probe according to the teachings of the present invention.

One embodiment of the present invention is illustrated in the exploded view of FIG. 1. Device 10 includes a base 12, filtrate reservoir 14, filter media support disc 16, filter media 18, and sample reservoir 20. Base 12 may include a base stabilization member 24 to prevent device 10 from tipping over when in use with a radiation probe as will be illustrated below in FIGS. 3-4. Base 12 also includes a circular lip 26 for engaging filtrate reservoir 14 in a compression or friction fitting. The terms "compression fitting" and "friction fitting" are used interchangeably herein to describe the following type of attachment or mounting means. Circular lip 26 has an inner diameter slightly less than the outer diameter of filtrate reservoir 14, both of which are made of material with some elasticity to allow a degree of flexibility. Accordingly, filtrate reservoir 14 fits snuggly into circular lip 26 with the bottom end of filtrate reservoir 14 effectively capped by the circular portion of base 12. The friction between connecting members, which is caused by the force from compression of one of the members, or the expansion of another member, serves to hold the two parts together.

Filtrate reservoir 14, in the embodiment illustrated, is a hollow cylinder for receiving the sample water after it has drained through filter media 18 and filter media support disc 16. A vacuum port 22 may be provided in filtrate reservoir 14 to aid in the passage of the water sample through filter media 18. That is, by connecting a vacuum source (not shown) to vacuum port 22, the resulting suction force on filter media support disc 16 and filter media 18 will cause an increase in flow across these elements, thus speeding up the sampling process if so desired. Conversely, the liquid sample can be eluted through the filtration media via gravitational force or by other means of applying positive and/or negative pressure. Positive pressure, for example, may be required if an ultra filtration media is selected.

Filter media support disc 16 is a circular disc with a disc recess 26 for receiving filter media 18. Filter media support disc 16 also includes upper rim 30, lower rim 32 (See FIG. 5), and disc lip 28 for supporting disc 16 when placed on top of filtrate reservoir 14. The structure of filter media support disc 16 in this embodiment provides a compression fitting between it and sample reservoir 20 on one side, and between it and filtrate reservoir 14 on the other side.

Disc recess 26 includes a plurality of apertures or holes, which may be round in cross-section, or any other shape, to allow the sample water to pass through filter media support disc 16 while still providing support to filter media 18 so that filter media 18 is held in place and does not fall or drop into filtrate reservoir 14 even when water is flowing through filter media 18.

Filter media 18 is a made of a suitable filtration material that allows water to pass through, but prevents any solids in the water above a certain particulate size from passing through it. That is, the filtration material is preferably of a size exclusion type. Size exclusion filtration is required to orient the analyte of interest on the upper surface of the filtration media so as not to have the radioactive component shielded by the filtration media itself. Additionally, the material of the filtration media must be hydrophobic and non-hydroscopic in nature as the presence of water on the surface of and within the filtration media could shield the alpha and beta radiation emissions from the detection probe. The desired porosity of filter media 18 may be varied in the use of device 10 depending on the nature of the water sample collected. For example, in water samples containing ultra and very fine solid particulate matter, an ultra and very fine filter material is needed for filter media 18. One suitable material for use as filter media 18 is sold under the trademark TEFLON, and other filter materials are well know in the art to which the invention pertains.

The shape of filter media 18 is such that it fits within disc recess 26 of filter media support disc 16, covering all of the apertures in disc recess 26 such that the water sample must pass through filter media 18 as the water flows from sample reservoir 20 into filtrate reservoir 14.

Sample reservoir 20 is a substantially hollow cylindrical shape with walls of suitable height and openings on both ends to provide a reservoir or basin for the water sample to be held in contact with filter media 18 so that it may flow through filter media 18 and into filtrate reservoir 14, thus causing particulate solids that were in the water to be deposited on or within filter media 18. The walls of sample reservoir 20 may be angled outward in the upward direction as shown in FIGS. 1-2 for ease of filling with the water sample.

Figure 2:
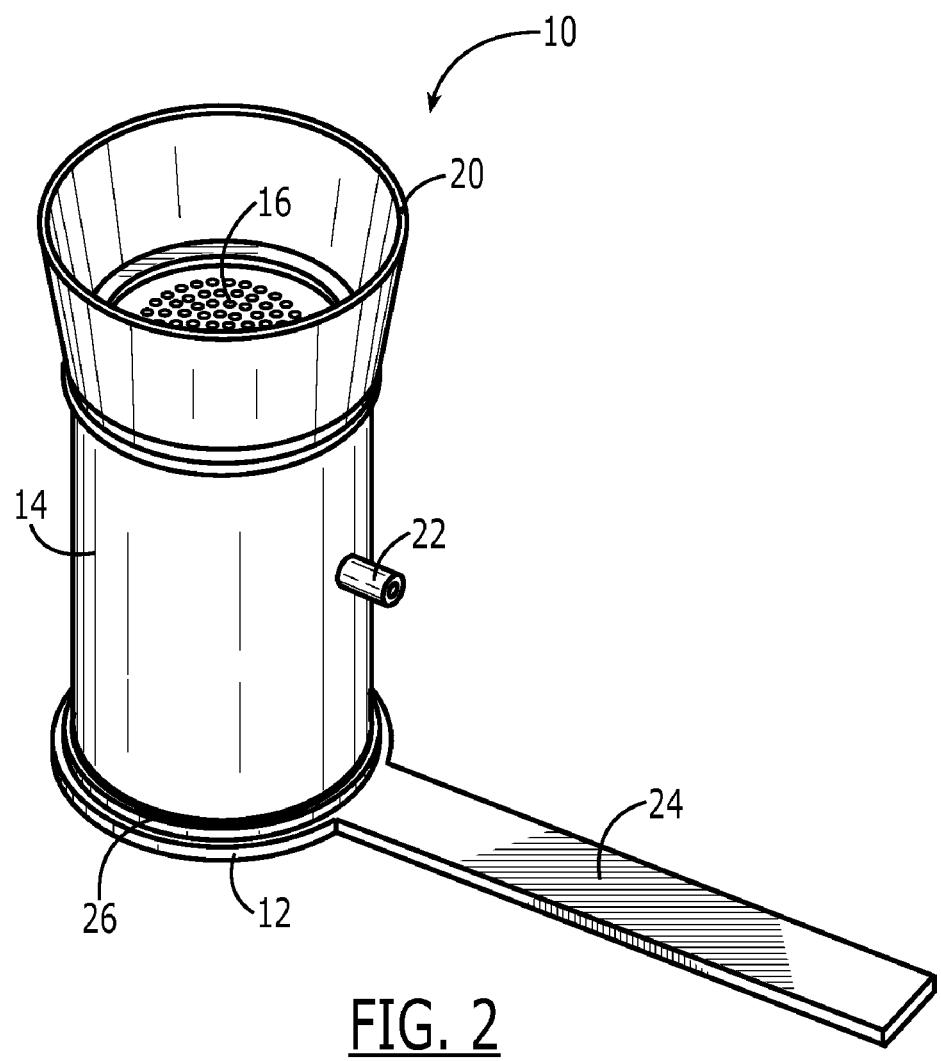
FIG. 2 is a perspective view showing the embodiment of FIG. 1 in its assembled state.

Turning to FIG. 2, the embodiment illustrated in the exploded view of FIG. 1 is shown in its assembled condition. Base 12 includes base stabilization member 24 and lip 26. Filter reservoir 14 rests atop base 12 with lip 26 forming a compression fitting with the bottom end of filtrate reservoir 14.

Filter media support disc 16 is held between sample reservoir 20 and filtrate reservoir 14 by a compression fitting formed between it and sample reservoir 20 on one end, and it and filtrate reservoir 14 on the other end. The majority of the top surface of filter media support disc 16 is exposed through the opening of the bottom end of sample reservoir 20 such that filter media 18 (not shown) can be placed atop filter media support disc 16 covering the apertures within filter media support disc 16 with the filter material. Sample reservoir 20, as illustrated, provides ample volume for holding a water sample in contact with filter media 18 (not shown) so that the water can flow through the filter media and into filtrate reservoir 14.

Figure 3:
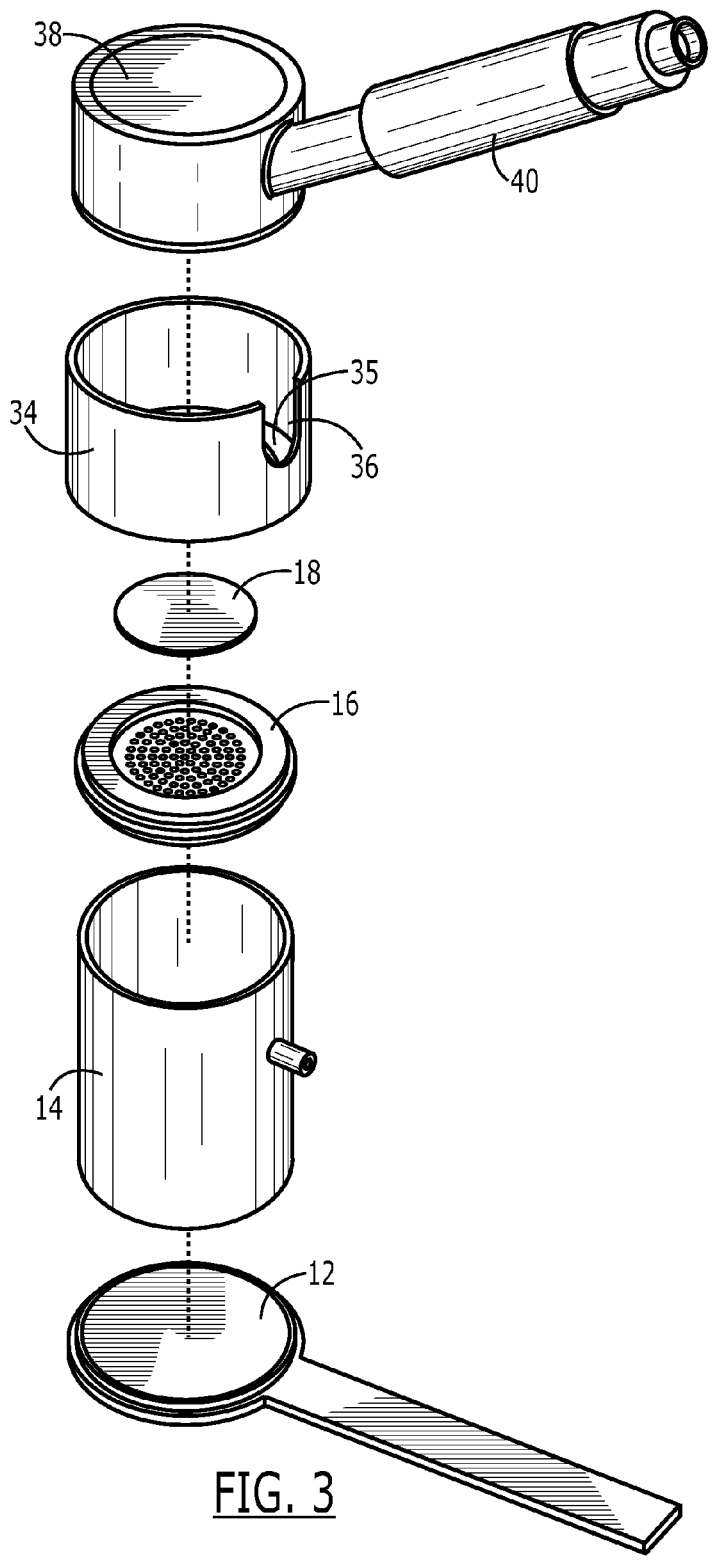
FIG. 3 is an exploded view illustrating the interaction of the present invention with a radiation probe.

Turning to FIG. 3, device 10 is shown with radiation probe adapter 34 for use with a conventional radiation probe 38 having a probe handle 40. The bottom end of radiation probe adaptor 34 is sized to fit with the upper surface of filter media support disc 16 with sample reservoir 20 (not shown) removed. That is, in operation, sample reservoir 20 is removed and radiation probed adaptor 34 is put in its place. Alternatively, sample reservoir 20 may include features of radiation probe adapter 34 as described below such that the former serves as both a sample reservoir and radiation probe adapter.

Radiation probe adapter 34 may include notch 36 to accommodate probe handle 40. Protruding rim 35 is provided to hold radiation probe 38 at a set distance above filter media 18. This prevents physical contact between radiation probe 38 and any solid particulates that may be on the face of filter media 18, as well as between radiation probe 38 and the filter media 18. By providing a repeatable and consistent separation distance and orientation between radiation probe 38 and the solid particulates collected from the water sample on the face of filter media 18, the measurements taken with radiation probe 38 are more accurate and precise than without this feature of the present invention.

Figure 4:
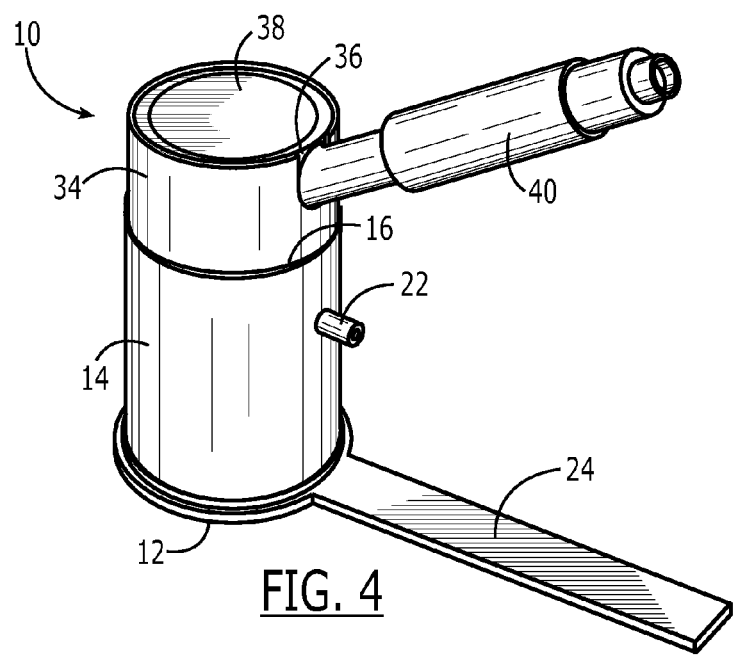
FIG. 4 is a perspective view showing the embodiment of FIG. 3 in its assembled state.

Turning to FIG. 4, the embodiment illustrated in the exploded view of FIG. 3 is shown in its assembled condition. Radiation probe 38 is held within device 10 by radiation probe adaptor 34. Notch 36 accommodates probe handle 40. The bottom of radiation probe adaptor 34 rests atop filter media support disk 16 and is held secure by a compression fitting between radiation probe adaptor 34 and filter media support disk 16. As illustrated here, stabilization member 24 of base 12 is placed so that it is orientated in substantially the same direction as probe handle 40 in order to offset the overturning force or moment created by the weight of probe handle 40. In a preferred embodiment, radiation probe adaptor 34 and filter media support disk 16 may accommodate an interlocking feature as provided by a male-female hole and plug. This would allow radiation probe adaptor 34 to sit with only one orientation such that probe handle 40 is oriented in the same direction as stabilization member 24.

As illustrated and described, device 10 is thus self-standing and stable when resting on any flat surface even with an overturning force resulting from the weight of a probe handle. As apparent to those with ordinary skill in the art to which the invention pertains, radiation probe adaptor 34 may be made in a variety of shapes and sizes to accommodate different radiation probes. For example, the radiation probe may have a surface area larger than the diameter of filtrate reservoir 14 and filter media support disc 16. In this case, the diameter of the upper portion of radiation probe adaptor 34 would be larger than illustrated here. As another example, in the situation where the particular radiation probe used with device 10 does not have a handle, or the handle is removed and there are no wires or other objects protruding from the side of the probe, notch 36 is not necessary. In addition, stabilization member 24 is not needed if there is no overturning moment to destabilize the device.

Figure 5:
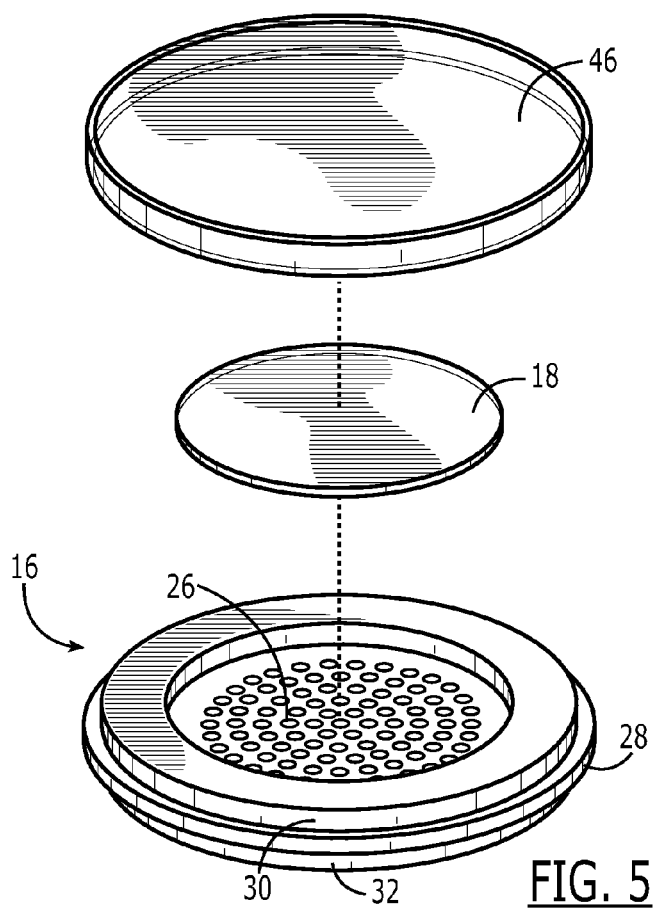
FIG. 5 is an exploded view illustrating the filter media support disc and the filter media containment means of the present invention.

Turning to FIG. 5, a larger view of filter media support disc 16 is provided to further describe its features. Filter media support disc 16 includes disc recess 26 having a plurality of apertures, lip 28, upper rim 30, and lower rim 32. Disc recess 26 is sized to accommodate filter media 18. When filter media 18 is placed in disc recess 26, the top surface of filter media 18 rests at an elevation below the top face of upper rim 30 and the material of filter media 18 covers all of the apertures within disc recess 26. Lower rim 32 and disc lip 28 form a first compression fitting in this embodiment, which is used to connect filter media support disc 16 to filtrate reservoir 14. Similarly, upper rim 30 and disc lip 28 form a second compression fitting in this embodiment, which is used to connect filter media support disc 16 to sample reservoir 20 or radiation probe adapter 34, interchangeably and without the need for tools.

Having fully described the structural features and elements of the present invention, attention is now turned to a description of its operation. There are many ways in which the present invention may be used as a water sampling device with a radiation probe for measuring the radioactivity of particulate solids found in water samples. The following description is provided by way of one example.

Device 10, with sample reservoir 20 inserted, is placed on a work surface which is relatively horizontal, flat, and stable. Such work surface may be a field-portable bench or table, or even the hood or bumper of a parked vehicle. Device 10 may also be used in a facility such as a laboratory where it can be placed on a laboratory bench or table. An aliquot of water is sampled and transferred into sample reservoir 20. This can be done manually or by an automated system of tubing and control valves.

Once the water sample has been added to the sample reservoir 20, gravity will cause the water to drain through filter media 18 and into filtrate reservoir 14. The solid particulates in the water sample that cannot pass through filter media 18 because of size restriction will deposit on or within filter media 18. Vacuum port 22 may be provided and utilized if a faster flow rate and shorter sample time are desired, or to overcome the filter bubble-point pressure. In such case, a vacuum source is attached to vacuum port 22 and the corresponding suction force increases the flow rate of water through filter media 18. Once the water sample has drained out of sample reservoir 20 and through filter media 18, one or more additional water samples may be added to sample reservoir 20, or the sample reservoir may be removed to proceed to the next step.

With sample reservoir 20 removed, radiation probe adaptor 34 is placed on top of filter media support disk 16 where it is fits snuggly by way of the compression fitting described above. Radiation probe 38 is then placed inside of radiation probe adaptor 34 where it is held at a set distance and orientation from filter media 18 by protruding rim 35. The orientation is such that the detection surface of radiation probe 38 is substantially parallel with and directly over filter media 18, thus providing for a consistent, optimal application of radiation probe 38.

After completing the radiation measurement, filter media 18 can be encapsulated by placing sample cap 46 over filtration media 18 and securing sample cap 46 to filter media support disc 16 by means of a compression fitting. A second sample cap may be provided to attach to the other side of filter media support disc 16, also by means of a compression fitting, thus sealing access that the air would otherwise have to filter media 18 through the apertures within filter media support disc 16. In this condition, the sample is preserved and may be transported or stored as desired.

While specific embodiments of the invention have been described, it will be understood that additional embodiments and various modifications may be made without departing from the spirit and scope of the invention. For example, the attachment means described in the preferred embodiment are compression fittings, but could be accomplished with threaded fittings or other coupling means. The parts of device 10, aside from filter media 18, can be made of a wide variety of impermeable or substantially impermeable materials, ranging from plastics and other polymers to metals and ceramics. Filter media 18 may be made of TEFLON or other filter media that are substantially inert, hydrophobic and non-hydroscopic, available in the desired shape, and allow water to pass freely while trapping solid particles on the surface of the filtration media. The suction means, which may be provided in some embodiments of the present invention, may be accomplished using a syringe, aspirator, or any type of mechanical vacuum pump. A pressurization means, which may be provided in some embodiments of the present invention, may be accomplished using various commercially available pumps, such as a positive displacement or plunger pump.

The sample reservoir 20 may be of various shapes and sizes to accommodate the desired volume of sample. Similarly, the radiation probe adaptor 34 may be of different shapes and sizes to accommodate different radiation probes. Accordingly, these and other embodiments of the invention fall within the scope of the following claims.

What is claimed is:

1. A water sampling device for use with a radiation probe, comprising:
    a base having a base connection means;
    a filtrate reservoir attachable to said base by said base connection means;
    a filter media;
    a filter media support disc having a first disc connection means, a second disc connection means, and a disc recess for holding said filter media, said disc recess having a plurality of apertures; and
    a sample reservoir, wherein said sample reservoir is attachable to said filter media support disc by the second disc connection means and is adapted for use with a radiation probe and includes a rim to position said radiation probe at a set distance above said filter media preventing physical contact between said radiation probe and said filter media when said probe is positioned in said sample reservoir; and
    wherein said filtrate reservoir is attachable to said filter media support disc by the first disc connection means.

2. The water sampling device of claim 1, wherein said base includes a stabilization member.

3. The water sampling device of claim 1, wherein said first disc connection means comprises a first compression fitting.

4. The water sampling device of claim 1, wherein said second disc connection means comprises a second compression fitting.

5. The water sampling device of claim 3, wherein said first compression fitting comprises a lip and a lower rim.

6. The water sampling device of claim 4, wherein said second compression fitting comprises a lip and an upper rim.

7. The water sampling device of claim 1, wherein said base, said filtrate reservoir, said filter media support disc, and said sample reservoir, are made of a polymer.

8. The water sampling device of claim 1, wherein said filtrate reservoir includes a vacuum port.

9. The water sampling device of claim 1, wherein said first disc connection means comprises a threaded fitting.

10. The water sampling device of claim 1, wherein said second disc connection means comprises a threaded fitting.

11. The water sampling device of claim 1, wherein said base, said filtrate reservoir, said filter media support disc, and said sample reservoir, are made of metal.

12. The water sampling device of claim 11, wherein said filtrate reservoir includes a vacuum port.

13. The water sampling device of claim 1, wherein said base, said filtrate reservoir, said filter media support disc, and said sample reservoir, are made of ceramic.

14. The water sampling device of claim 13, wherein said filtrate reservoir includes a vacuum port.

* * * * *